July 7, 1970 P. O. TAUSON 3,519,374
PARTIAL ADMISSION VALVE MECHANISM FOR ROTARY ENGINE
Filed June 26, 1968 2 Sheets-Sheet 1

INVENTOR.
PETER O. TAUSON

INVENTOR.
PETER O. TAUSON

United States Patent Office 3,519,374
Patented July 7, 1970

3,519,374
PARTIAL ADMISSION VALVE MECHANISM FOR ROTARY ENGINE
Peter O. Tauson, Bradford Woods, Pa., assignor, by mesne assignments, to the United States of America as represented by the U.S. Atomic Energy Commission
Filed June 26, 1968, Ser. No. 740,235
Int. Cl. F01c 1/00
U.S. Cl. 418—65                2 Claims

ABSTRACT OF THE DISCLOSURE

A rotary piston expansion engine having an internal admission valve mechanism utilizing a curtain valve with a reciprocating cut-off valve actuated by the curtain valve to provide gas admission during a portion of the expansion period.

BACKGROUND OF THE INVENTION

Recent studies indicate that an artificial human heart supported by an implantable power source is technically feasible, provided the functioning parts of such a system can be made highly miniaturized and reliable. One such system under consideration utilizes a steam engine to drive a water pump which energizes hydraulically a replacement mechanical heart.

A system of this type can be successfully employed only if the operative elements are miniaturized and very reliable. One element of the system which has received considerable attention is that of a steam engine of rotary piston design.

The rotary piston steam engine operating on the Rankine cycle is known to be a highly reliable device, capable of great compactness, and lacking many of the deficiencies of the reciprocating piston type of engine. For high efficiency operation it is necessary to have large expansion ratio. To achieve this in a reciprocating engine, close clearances and multiplicity of expansion stages are necessary. Because of the geometry of the rotary engine the large expansion ratio can be accomplished in a single stage. Thus superheated inlet steam in a reciprocating piston engine must be used which results in temperatures considered to be excessive for the particular application. In addition, this engine is attitude sensitive, has high dynamic forces resulting from piston reversal, and other problems associated with this type of engine.

The rotary piston engine avoids the aforementioned problems including a lack of attitude sensitivity and a tolerance for condensate in the expansion chamber. For these and other reasons the rotary piston steam engine has acquired great appeal for possible use in situations where great compactness, reliability, and dependability are required, such as in space craft and implantable circulatory support systems.

Some of the principal drawbacks or disadvantages of the rotary piston steam engine are associated with what has been up to now complex valving systems for controlling the supply of steam to the engine cylinders. Heretofore, external mechanical arrangements have been utilized to time the operation of the valves with that of the rotation of the engine shaft. While such arrangements may be suitable where the engine is stationary, of usual size, and readily accessible for maintenance and repair, this type of design raises a question of sufficient dependability for the applications mentioned.

SUMMARY OF THE INVENTION

The invention described herein was made in the course of, or under a contract with the U.S. Atomic Energy Commission.

The present invention avoids many of the aforementioned problems of the rotary piston engine by providing an improved valving construction which is internal of the engine and capable of greater miniaturization by virtue of its relatively simple construction. In addition, the invention is capable of providing a variable cut-off of the valve inlet.

In accordance with this invention, the rotary piston engine utilizes a curtain valve incorporating a slot or passageway for effecting transfer of inlet steam during certain positions of the valve, thereby avoiding camming and valve lifting devices. In a modification of the invention, a sliding wedge or a variable width opening may be used to produce effectively a variable cut-off in the operation of the engine.

It is thus a principal object of the invention to provide an improved rotary piston engine with a unique internal valve construction.

Other objects and advantages of this invention will become readily apparent from a description of preferred embodiments of this invention given with respect to the accompanying drawings.

DESCRIPTION OF THE PREFERRED EMBODIMENTS

Figure 1:
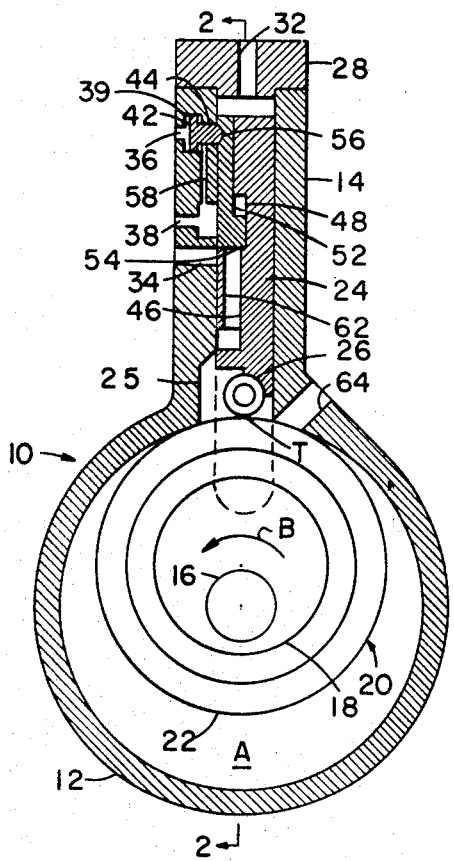
FIG. 1 is an elevation view in section of a one cylinder constructed in accordance with this invention.
Figure 2:
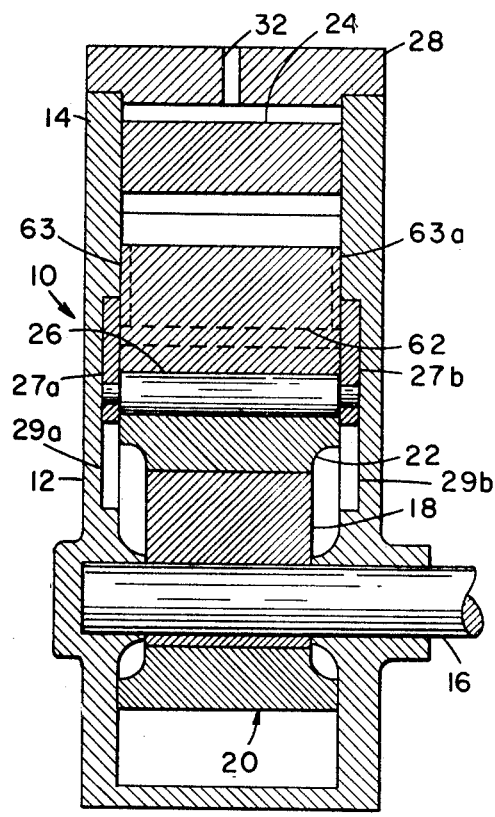
FIG. 2 is a view along 2—2 of FIG. 1.

Referring to FIGS. 1 and 2, rotary steam engine 10 consists of a cylinder A formed by cylinder block 12 with a steam chest 14 and main shaft 16 extending out of block 12 to deliver the shaft power of the engine. Mounted eccentrically on shaft 16 for rotation therewith is a circular eccentric assembly 20 which includes bearing 18 supporting a cylindrical power roller 22. The latter may be free to slide on bearing 18. As is understood in the art, the outer surface of power roller 22 at point T, the greatest distance from the center of rotation, contacts and sweeps during rotation the inside surface of cylinder 12.

Valve chest 14 contains an extended reciprocating curtain valve 24 which is provided at the bottom thereof with a rolling or sliding contact 26 for contact with the outer surface of power roller 22. Valve 24 is curved at the bottom to accommodate contact 26 closely to minimize the transfer of fluid past valve 24 for reasons to be described further below. Contact 26 is supported by end slides 27a and 27b which reciprocate in slots 29a and 29b. A recess 25 along one of the inner walls of steam chest 14 leads into cylinder A, for reasons to be explained further below.

Figure 3A:
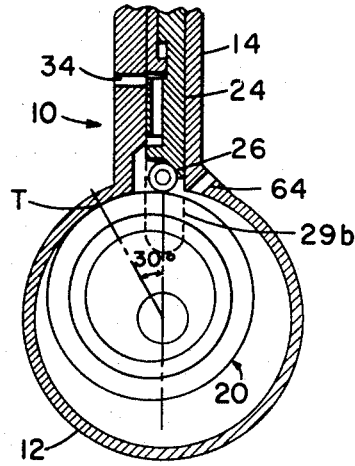
FIGS. 3a through 3f show different positions of the moving parts during the course of rotation of the power shaft of the engine shown in FIGS. 1 and 2.
Figure 3B:
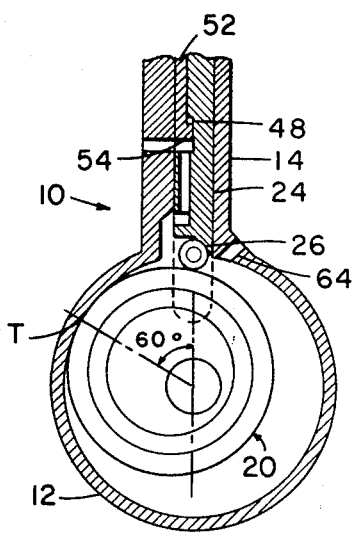
Figure 3C:
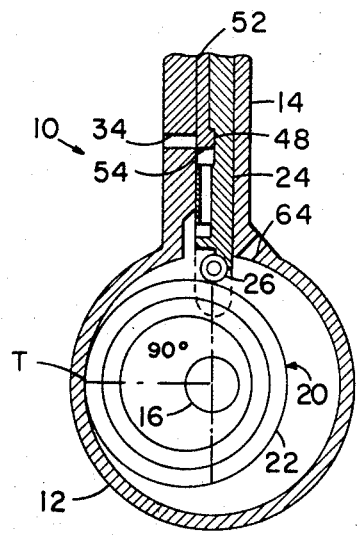
Figure 3D:
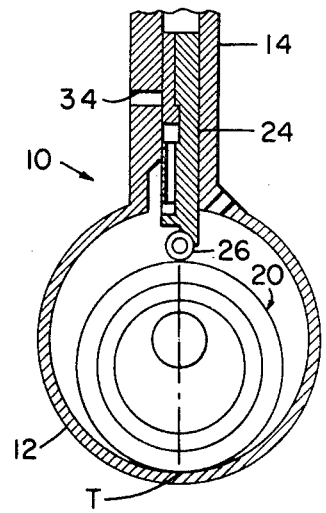
Figure 3E:
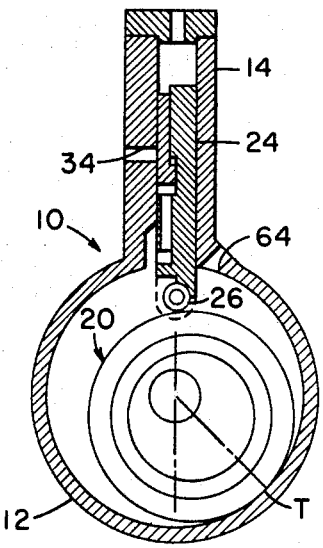
Figure 3F:
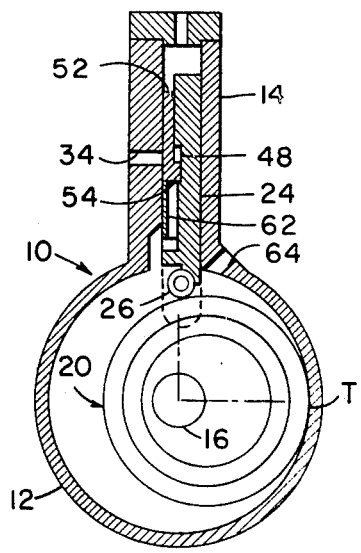

The space above curtain valve 24 is closed off with a cover 28 having an opening 32. Valve 24 has limited sliding movement between its uppermost position shown in the FIG. 1 and the lowest position with power roller 22 rotated 180° (as seen in FIG. 3d). Curtain valve 24 is biased downwardly by exposing the upper portion to high pressure steam through opening 32. If desired, a spring may be used.

Valve chest 14 is provided on one side with a pair of pressure inlet ports 34 and 36, and an exhaust pressure port 38. Port 36 enters into a cylinder 39 containing a detent piston 42 which has a detent 44 which extends toward the hollow portion of valve chest 14. When inlet 36 is pressurized detent piston 42 is urged in the direction of and protrudes into the hollow portion of chest 14, for a purpose to be later described.

It will be noted that curtain valve 24 is slotted with an extended slot 46 and a shorter, deeper slot 48. An L-shaped cut-off valve 52 slides as shown in the space between curtain valve 24 and one wall of valve chest 14. The leg 54 of cut-off valve 52 rides in slot 48 and is limited in movement to the length of that slot. With cut-off valve 52 in the position shown in FIG. 1, raised fully by power roller 22 and the lower end of slot 48 engaged with leg 54, a groove 56 in cut-off valve 52 is engaged by detent 44 which thereby holds valve 52 in position. Pressurized steam escaping past detent piston 42 exhausts through a passageway 58 to exhaust port 38. A curtain valve finger 62 consisting of a plate extending down from the lower end of slot 48 is attached at the sides thereof by walls 63 and 63a to slide with curtain valve 24 for a purpose to be later described. Exhaust port 64 carries away the exhaust steam from inside cylinder wall 12.

In the operation of engine 10, main shaft is rotating in the direction of arrow B. As seen in FIG. 1, the highest point of roller 22 is on the vertical axis of the engine, or, for reference purposes, a 0° of rotation. Cut-off valve 52 is restrained from movement by detent 44, while finger 62 closes off steam pressure from port 34. The bottom wall of slot 46 closes off the entrance to recess 25.

As shown in FIGS. 3a–3f, as shaft 16 rotates counterclockwise, curtain valve 24 descends in a forward movement, opening simultaneously inlet port 34 and recess 25 so that steam vapor begins to fill the space formed between T on roller 22 and contact 26 riding on the outer surface of roller 22. When the angle of rotation reaches 90°, shown in FIG. 3c, the upper end of slot 48 catches leg 54 of cut-off valve 52 and begins to move it downward, disengaging it from detent 44. At 90°, also, cut-off valve 52 blocks inlet port 34. The pressurized vapor trapped between roller 22 and wall 12 below recess 14a exerts a force against the eccentrically supported roller 22 causing it along with shaft 16 to rotate, as the remaining surface of roller 22 is exposed to outlet port 64 which is at a lower pressure, usually about atmospheric pressure. After the low point of curtain valve 24 is reached (FIG. 3d), the latter begins to rise in its reverse movement, and at about 270° of rotation (FIG. 3f) the lower end of slot 48 moves up to engage the lower surface of leg 54 and begins to raise cut-off valve 52. Due to the presence of finger 62, inlet port 34 remains closed until the elements returned to 360° or 0° of rotation once again. When the high point T of roller 22 sweeps by exhaust port 64 the expanded steam exhausts and the engine is ready for the next cycle to begin at 0°.

It is thus seen that there has been provided an improved arrangement for a rotary engine in which all valve operation is conducted internally and with a minimum of moving parts so that there is greater reliability and dependability. While in the arrangement described there is a fixed point in the cycle for terminating and beginning steam inlet to the cylinder, a variable timing arrangement can be obtained merely by inserting into slot 48, above and/or below leg 54 a wedge element which when moved transversely from means extending out of engine 10 can alter the point in the cycle when leg 54 is contacted for upward or downward movement.

I claim:
1. A rotary piston gas expansion engine comprising:
 (a) a cylinder wall forming a cylinder of circular cross-section;
 (b) an eccentrically mounted roller mounted for rotation within said cylinder, the point of greatest radius on said roller sweeping the inside wall of said cylinder;
 (c) a hollow valve chest communicating with said cylinder extending out therefrom;
 (d) curtain valve means supported for reciprocal forward and reverse movements within said chest and means biasing said curtain valve means forwardly with the lower end of said curtain valve means riding on the outer surface of said roller, the forward movement being toward the center of rotation of said roller;
 (e) inlet port means for admitting gas under pressure into said chest on one side of said curtain valve means;
 (f) exhaust port means in said cylinder wall on the opposite side of said curtain valve means to exhaust the gas after expansion thereof;
 (g) said curtain valve means provided with slot means to receive gas from said inlet port means and communicating with said cylinder;
 (h) reciprocating cut-off valve means mounted in said slot means between said curtain valve means and the wall of said chest having said inlet port means for slidable movement with respect to both said curtain valve means and said chest means maintaining said cut-off valve means in an initial position unblocking said inlet port means; and
 (i) said curtain valve means during forward movement moving from a position blocking said inlet port means to a position opening said inlet port means, said curtain valve means having means for moving said cut-off valve means from said initial position to a position blocking said inlet port means after an interval of opening of said inlet port means admitting high pressure gas, thereby blocking said inlet port means to prevent admission of gas during the remainder of the forward movement, and during reverse movement said curtain valve means returning said cut-off valve means to said initial position.

2. The engine of claim 1 in which said curtain valve means has finger means extending therefrom for blocking said inlet port means during reverse movement of said curtain valve means.

References Cited

UNITED STATES PATENTS

| 157,429 | 12/1874 | Teal | 91—98 |
| 304,298 | 9/1884 | Covert et al. | 91—97 |
| 518,635 | 4/1894 | Tasker | 91—103 |
| 595,536 | 12/1897 | Fassett | 91—103 |
| 606,080 | 6/1898 | Pearce | 91—103 |
| 2,804,055 | 8/1957 | Hill et al. | 91—337 |

FOREIGN PATENTS

| 374,850 | 4/1907 | France. |
| 508,790 | 8/1920 | France. |
| 1,106,365 | 7/1955 | France. |
| 382,567 | 10/1932 | Great Britain. |

MARTIN P. SCHWADRON, Primary Examiner

I. C. COHEN, Assistant Examiner

U.S. Cl. X.R.

91—410